March 12, 1957 D. W. DAVIES 2,784,906

ELECTRONIC DIGITAL COMPUTERS WITH PULSE WIDENING MEANS

Filed April 10, 1952 4 Sheets-Sheet 1

Inventor
Donald Watts Davies
By
Stevens, Davis, Miller & Mosher
Attorneys

March 12, 1957 D. W. DAVIES 2,784,906

ELECTRONIC DIGITAL COMPUTERS WITH PULSE WIDENING MEANS

Filed April 10, 1952 4 Sheets-Sheet 2

Inventor
DONALD WATTS DAVIES
By Stevens, Davis, Miller & Mosher
Attorneys

ELECTRONIC DIGITAL COMPUTERS WITH PULSE WIDENING MEANS

Filed April 10, 1952 4 Sheets-Sheet 3

| SIGNALS (FIG. 5) | PULSE PERIODS | | | | | | | | |
|---|---|---|---|---|---|---|---|---|---|
| | P1 | P2 | P3 | P4 | P5 | P6 | P7 | P8 | P9 |
| A | 1 | 1 | 0 | 0 | 1 | 0 | 0 | 1 | |
| B | 0 | 1 | 0 | 1 | 1 | 1 | 0 | 0 | |
| A'' | | 1 | 1 | 0 | 0 | 1 | 0 | 0 | 1 |
| B'' (Addition) | | 0 | 1 | 0 | 1 | 1 | 1 | 0 | 0 |
| E = (A'' ≢ B'') | | 1 | 0 | 0 | 1 | 0 | 1 | 0 | 1 |
| G = (A'' & B'') or (E & C) | 0 | 0 | 1 | 0 | 0 | 1 | 1 | 0 | 0 |
| C = G delayed one unit | | 0 | 0 | 1 | 0 | 0 | 1 | 1 | 0 |
| F = (E ≢ C) and is the adder output | | 1 | 0 | 1 | 1 | 0 | 0 | 1 | 1 |

Inventor
DONALD WATTS DAVIES
By
Stevens, Davis, Miller & Mosher
Attorneys

ELECTRONIC DIGITAL COMPUTERS WITH PULSE WIDENING MEANS

Filed April 10, 1952 4 Sheets-Sheet 4

Inventor
DONALD WATTS DAVIES
By Stevens, Davis, Miller & Mosher
Attorneys

United States Patent Office 2,784,906

Patented Mar. 12, 1957

2,784,906

ELECTRONIC DIGITAL COMPUTERS WITH PULSE WIDENING MEANS

Donald Watts Davies, Southsea, England, assignor to National Research Development Corporation, London, England, a British corporation Application April 10, 1952, Serial No. 281,603

Claims priority, application Great Britain April 21, 1951

11 Claims. (Cl. 235—61)

The present invention relates to electronic digital computors. Such computors use electrical pulse patterns to represent numbers and instructions, usually referred to generically as words, and one of the difficulties experienced in operating these computors is that when two numbers represented by pulse patterns have to be combined to effect a logical or arithmetical operation, pulses in one pattern are not quite contemporaneous with pulses in the other pattern, owing to distortion and slight variation in the delays of the circuits employed.

It is an object of the present invention wholly or in part to overcome this difficulty.

According to the present invention there is provided in an electronic digital computor means for widening digit pulses of words before the words undergo an arithmetical or logical operation. The widening may be, and preferably is, such that if two pulses occur in consecutive digit positions, the potential or current representing them does not return to a base line between the pulses.

After the arithmetical or logical operation, the pulses may be restored to their normal discreet state by being gated with clock pulses. (The nomenclature used in this specification is well-known to those skilled in the art and is explained at length in the U. S. application of James H. Wilkinson, Serial No. 202,615, now Patent No. 2,686,632, filed December 26, 1950, for Digital Computers.)

It will be appreciated that although circuits may delay a pulse and distort it, for example, by preventing a rapid rise and fall of potential at the beginning and end of a pulse, it is not possible for a circuit to anticipate the coming of a pulse, so that to widen a pulse to fill a whole digit space is possible only if the pulse is delayed and widened to fill the next digit space, and this is done in the present invention. The result of this is that the words are thrown out of synchronism with other words stored in the machine, and to get them back into synchronism compensation may be produced by passing them through a device which produces a delay of ($n-1$) digit periods where $n$ is the number of digits in a word.

In an alternative arrangement the stores in the computor can be arranged to deliver words one digit in advance of the periods in which words are transferred back to the stores. For example when mercury delay line stores are used to store, say, $p$ digits the length of the line may be such that it stores ($p-1$) digits and a unit delay may be included in the circulation path of the line so that altogether $p$ digits are stored; the source gate would then be arranged at the output of the line before the unit delay and the destination gate would be arranged at the input of the line after the unit delay.

In order that the present invention may be more particularly described reference is made to the accompanying drawings. The invention will be particularly described with reference to a computing engine employing words of 32 digits the pulse periods of which are hereinafter represented by P1, P2, . . . to P32, the digit period being 1 micro-second and the normal active length of a digit being ⅓ micro-second.

In the drawings, Figures 1, 2 and 3 illustrate pulses used in electrical computing engines.

Figure 1:
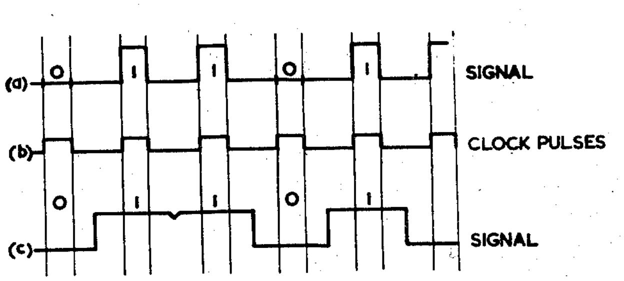

Figure 1 shows at (*a*) a pulse pattern representing part of a word. At (*b*) there is shown the corresponding clock pulses and at (*c*) there is shown the signal shown at (*a*) with pulses widened according to the present invention. The normal timing relationship of the clock pulses is as shown, that is to say, the clock pulses lie in the middle of the wide pulses.

The invention will be particularly described with reference to an adder and for convenience, an adder of the kind described in the U. S. application of Edward Arthur Newman, et al., Serial No. 201,286, now Patent No. 2,694,521, filed December 18, 1950, for Digital Computing Engines will be used.

Some delay is inherent in an adder for the following reason: Suppose the two numbers to be added both have a "one" in a given digit position and that there is no carry over into this position, then in binary arithmetic the result in this digit position must be zero. However it cannot be decided that the result is zero until both "ones" have certainly arrived.

Figure 2:
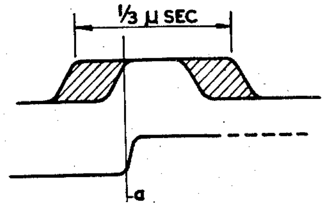

The waveform in Figure 2 shown by means of a shaded area, the range of variation, somewhat exaggerated, which a narrow pulse may experience and not until time "*a*" when both signals have certainly settled down can an adder safely begin to transmit the required necessary digit. In the present invention the inherent delay has been fixed at exactly 1 digit period, that is to say, in the present case 1 micro-second.

Figure 3:
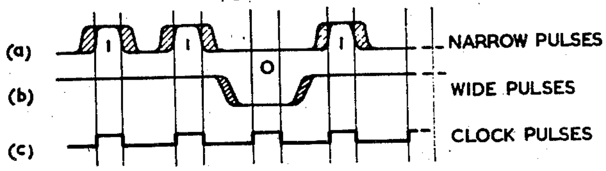

This is done by widening the pulse from ⅓ to 1 micro-second and delaying the pulse ⅔ micro-seconds so that the middle of the modified pulse lies fairly on the next clock pulse. An advantage of this arrangement is that there is only one area of ambiguity for each pulse as compared with two in the cases of narrow pulses. This is illustrated in Figure 3, which also illustrates the principle of sampling wide pulses that are variable, by means of clock pulses. It will be seen that the clock pulses lie only in the unambiguous part of the wide pulses. Pulses used in the normal circulation system (into which the adder may be inserted to form an accumulator) are narrow and according to the invention, they are widened, before being used in the adder.

Figure 4:
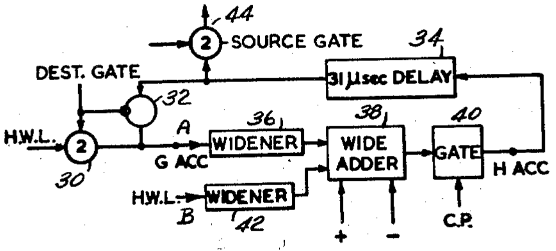
Figure 4 shows diagrammatically the inclusion of an adder operated according to the invention in part of a computing engine.

The position of the adder in an accumulator may be as shown in Figure 4. The add and subtract destinations are shown attached to the adder, and they modify its action in the manner described below. This accumulator works in the usual manner. That is to say at an appropriate time the terminal Dest. Gate is fed with a voltage which opens the gate 30 and closes the gate 32. This destroys the contents of the delay line 34 at the gate 32 and allows the digit pulses present on H. W. L. to enter the delay line 34 via the gate 30, the widener 36, the adder 38 and the reshaping gate 40. The delay line 34 has a delay of 31 microseconds and the widener 36 and the adder 38 introduce a further delay of one micro-second (in a manner to be more particularly described with reference to Fig. 5) so that the 32-digit word introduced into the accumulator (i. e. the elements 34, 36, 38, 40) circulates unchanged until another number is introduced via the widener 42 from H. W. L. by a destination gate similar to 30 but not shown in the drawing. When this new member is introduced it is added to the contents of the accumulator by the adder 38. H. W. L. represents a common channel or bus often called in the art "highway" which inter-connects the various destination and source gates (e. g. 30 and 44). As is well known, a word is transferred in these engines by opening at appropriate times one desired source gate which allow the digit pulses of the word to flow on to highway and at the same time opening one desired destination gate which allows the pulses to flow into the desired destination from highway. The circulation system may include a widener and a clock pulse gate of its own to restore the normal timing as described in the U. S. application of Edward Arthur Newman, et al., Serial No. 205,005, now Patent No. 2,750,499, filed January 8, 1951, for Circuits for Ultrasonic Delay Lines. In addition the adder has its own wideners and restoring gate to make an independent correction of timing.

Figure 5:
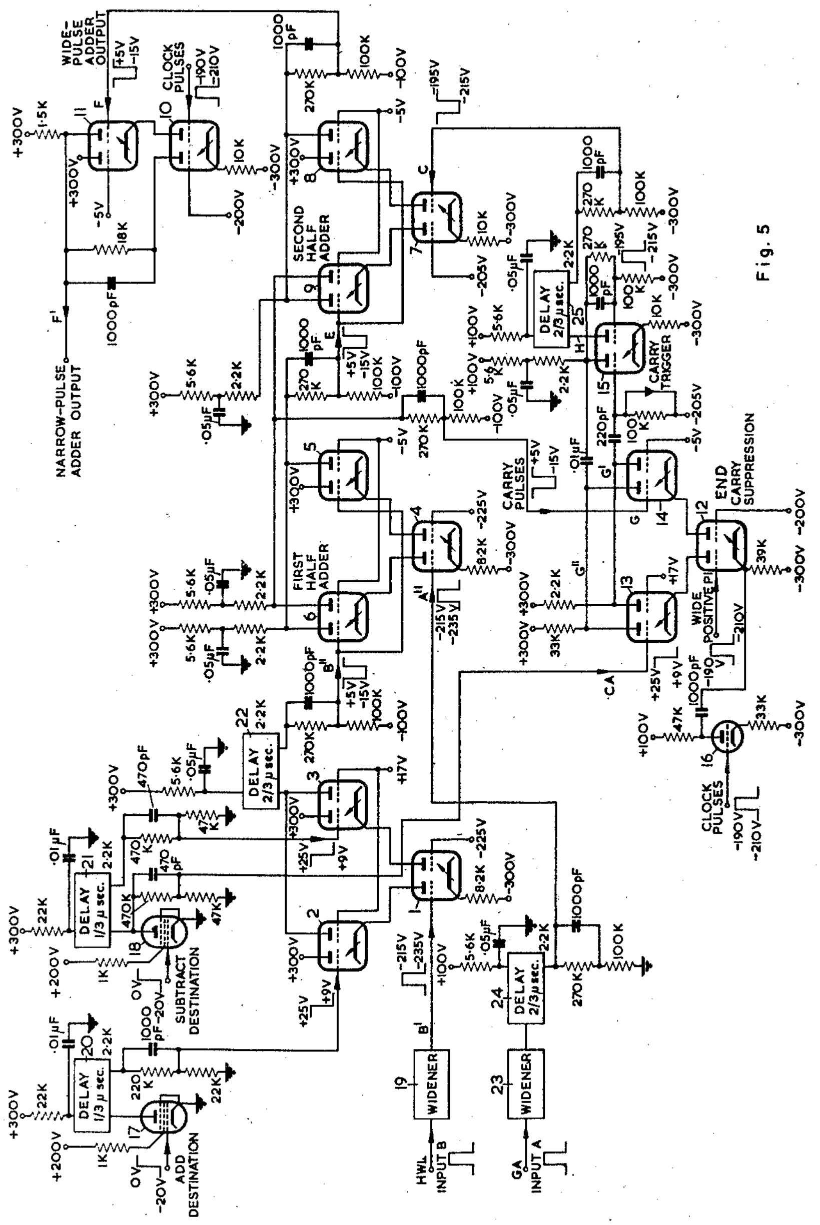
Figure 5 shows in greater detail the adder shown in Figure 4.

Details of the adder are shown in Figure 5. The adder is in essence a serial binary adder comprising two half adders of the kind described in U. S. application of Newman, et al., Serial No. 201,286 supra. As is well known, a binary half adder comprise a circuit having two inputs and two outputs. The first output, called the "and output" or "& output," gives a "one" (a pulse) when, and only when, ones are present at both inputs, the second output, called the "not-equivalent output" or "$\not\equiv$ output," gives a one when and only when the two inputs are different i. e. one-zero or zero-one.

The digit pulses of the numbers to be added are applied to the first half adder (in this case made up by the valves 4, 5 and 6) and the inputs to the second half adder are (1) the not-equivalent output of the first half adder and (2) the & outputs from the first and second half adders applied through a unit delay. The output of the complete adder is the not-equivalent output of the second half adder. In this case the second half adder is made up of the valves 4, 5 and 6 and the unit delay is introduced by the action (as hereinafter explained) of the valves 12, 13, 14 and 15 and the delay 25.

As is usual, the adder can perform binary subtraction as well as addition. Subtraction is done by adding the negation of the number to be subtracted and one with end carry suppression, thus:

A−B=A+(not B)+1, with end carry suppression

This may be illustrated by a simple example:

Suppose, A=23, that is in binary notation 10111
B=13, that is in binary notation 01101,
then A−B=10, that is in binary notation 01010, is obtained as follows:

| | |
|---|---|
| A | 10111 |
| not B | 10010 |
| | 1 |
| Add and suppress end carry digit | (1) 01010 |

The adder employs double triode valves each connected to have a common cathode load, which in some cases may be another double triode valve, as in the case of valves 2 and 3 which each have an anode-cathode path of the valve 1 as their common cathode loads. These double triodes are often used as gates in computing engines and they conduct on one side only, provided their grid potentials differ by more than the cathode-grid voltage necessary to cut each triode off (this voltage is often called a grid base). This action is due to the fact that the cathode potential nearly follows the potential of the higher grid so that the other grid is more than a grid base below the common cathode potential and the corresponding half of the valve is cut off.

As double triodes we use valves designated ECC91 and since a difference of grid potentials of 10 volts cuts one side off, we therefore, use a grid voltage swing of about 20 volts on the input side of a double triode and bias the other grid about midway between the extremes of the input grid. The input voltages and the bias voltages are indicated in the drawing and an arrow indicates the path on which the valve conducts (if at all) in the resting state, i. e. in the absence of an input signal. We say "if at all" because in some cases (e. g. the valve 2) a valve may be cut off altogether owing to the state of another valve (e. g. the valve 1) which forms its common cathode circuit; in this case the arrow shows the conducting path when the other valve (e. g. 1) is switched while no signal is applied to the first valve (e. g. 2).

The coupling between the separate valves are direct-current couplings and are frequency corrected so as to pass good shaped pulses. Couplings suited to both triode and pentode valves are given in the drawing. The circuit of the delays used is given in Fig. 7 and it should be noted that the delay has a direct current resistance of 2200 ohms and this is indicated by 2.2K in Fig. 5 at each delay.

Figures 6, 7:
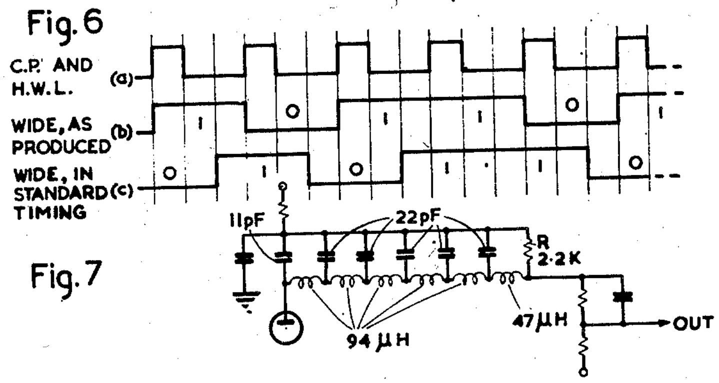
Figures 6, 8 and 9 show the timing and nature of pulses used in the adder shown in Figure 5.
Figures 7 and 10 show details of the circuit arrangement shown in Figure 5.

The operation of the circuit may now be described in detail. Suppose first that the circuit is to operate as an adder (as distinct from a subtractor). A positive-going pulse, one minor cycle long, is applied to the control grid of the valve 17 and causes it to conduct during the whole of the addition process. This causes the valve 2 to conduct (if at all) on its right-hand anode. Narrow pulse signals representing the number B are applied from highway at H. W. L. and the digit pulses are widened by the widener 19 to have a timing as shown in Fig. 6 at (*b*). These wide pulses become incident at $B^1$, the input of the valve 1, and switch it when a pulse or a series of pulses is present (representing a one or series of ones). This causes a corresponding sequence of wide negative-going pulses to appear at the right-hand anode of the valve 2. The switching impulse from the valve 17 is delayed by the delay 20 to bring it to the timing of Fig. 6(*b*) to deal with the wide pulses at $B^1$.

The pulses at the right-hand anode of the valve 2 become incident, after passing through the delay 22, at one input $B^{11}$ of the first half-adder (4, 5, 6) with the timing shown in Fig. 6(*c*).

Narrow pulse signals representing the number A from the accumulator circulation are applied on GA to the widener 23 and through the delay 24 connected in the anode circuit of the output of the widener to become incident as wide positive-going pulses with the timing shown in Fig. 6(*c*) at the other input $A^{11}$ of the first half adder (4, 5, 6).

The valves 4, 5 and 6 conduct, for various values of the inputs $A^{11}$ and $B^{11}$ as follows:

| Input | Valve 4 | Valve 5 | Valve 6 |
|---|---|---|---|
| $A^{11}$=0 $B^{11}$=0 | Right anode | Left anode | None. |
| $A^{11}$=1 $B^{11}$=0 | Left anode | None | Left anode. |
| $A^{11}$=0 $B^{11}$=1 | Right anode | Right anode | None. |
| $A^{11}$=1 $B^{11}$=1 | Left anode | None | Right anode. |

The left-hand anode of the valve 6 and the right-hand anode of the valve 5 are joined and give the not-equivalent output of the half adder in the form of wide negative-going pulses which are applied to one input E of the second half adder (7, 8, 9).

The right-hand anode of the valve 6 gives the & output from the first half adder in the form of negative-going pulses on the input line G to the valve 14.

The second half-adder (7, 8, 9) operates in a similar way with the input pulses at E and C. Note that the pulses at C (the generation of which is explained below) are negative-going pulses and are applied to the right-hand grip of the valve 7 to effect switching.

It is a simple matter to see that the not-equivalent output from the second half adder (which is the output in wide pulses from the complete adder) is obtained from the joined left-hand anode of the valve 9 and the right-hand anode of the valve 8. The & output, which also contributes carry pulses at the input G of the valve 14, comes from the right-hand anode of the valve 9.

The pulses at C are wide delayed carry pulses derived from the carry pulses on the line G as follows:

The valve 12 is supplied on its cathode with clock pulses from the valve 16; these cause the valve 12 to conduct during the incidence and normally conduction is on the right-hand anode of the valve 12 to the valve 14. Consequently narrow negative-going pulses corresponding to the wide pulses at G appear at $G^1$ and narrow negative-going pulses corresponding to not-G appear at $G^{11}$. This is because the valve 14 is switched by the undelayed carry pulses on G. All this takes place in the first thirty-one pulse periods of the addition but in the last pulse period the valve 12 is switched by a wide positive-going $P^1$ pulse applied to its left-hand grid. (It should be remembered that at this part of the circuit all pulses are delayed one unit compared with engine time and a wide $P^1$ pulse in engine time covers the last digit period at this point in the adder). When the wide $P^1$ pulse is incident at the valve 12 conduction is switched to the left-hand anode of the valve 13 (during addition no signal occurs on the line CA) and a pulse appears on the line $G^{11}$ and no pulse can appear on the line $G^1$ irrespective of whatever signal appears on the carry pulse line G. This part of the circuit constitutes the round carry suppression arrangement which is usually incorporated in a binary adder and it ensures that no carry pulse occurring in the last digit period of the addition can pass on to affect another addition which may take place immediately after the current addition.

The pulses on the line $G^1$ (which are narrow pulses reshaped and retimed by clock pulses) correspond to the carry pulses on G (except, as explained, during the last digit period) and these narrow pulses put the carry trigger valve 15 on (i. e. switch conduction to the right-hand anode); similarly the narrow pulses on the line $G^{11}$ (which correspond to not-G) put the trigger 15 off (i. e. restore conduction to the left-hand anode). This action gives wide pulses corresponding to the carry pulses G but delayed ⅓ microsecond and a further delay of ⅔ microsecond produced by the delay 25 gives wide delayed carry pulses on the line C as required. The production of wide pulses by the carry trigger 15 will become clear when a particular example of operation of the adder is considered in detail with reference to Fig. 9.

Suppose an addition is to be made in which the number A starts 11001001 . . . and the number B starts 01011100 . . . (In these examples the least significant digits of the numbers are written on the left to correspond to the graph in Fig. 9 of the electrical pulses representing them), then the addition by the ordinary rules of binary arithmetic will run as follows:

| | |
|---|---|
| A | 1 1 0 0 1 0 0 1 . . . |
| B | 0 1 0 1 1 1 0 0 . . . |
| (A≢B) | 1 0 1 1 0 0 1 1 . . . |

Figures 8, 10:
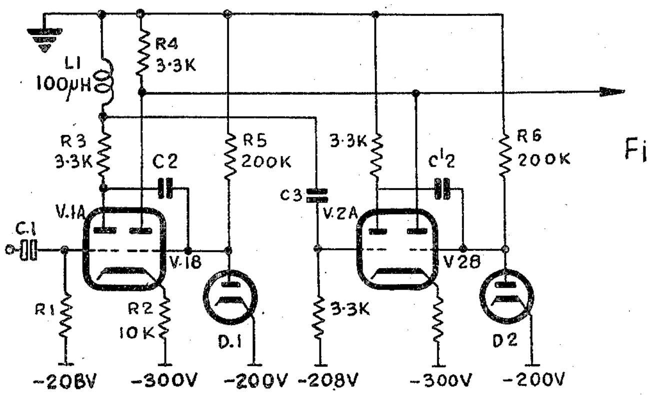
Figure 9:
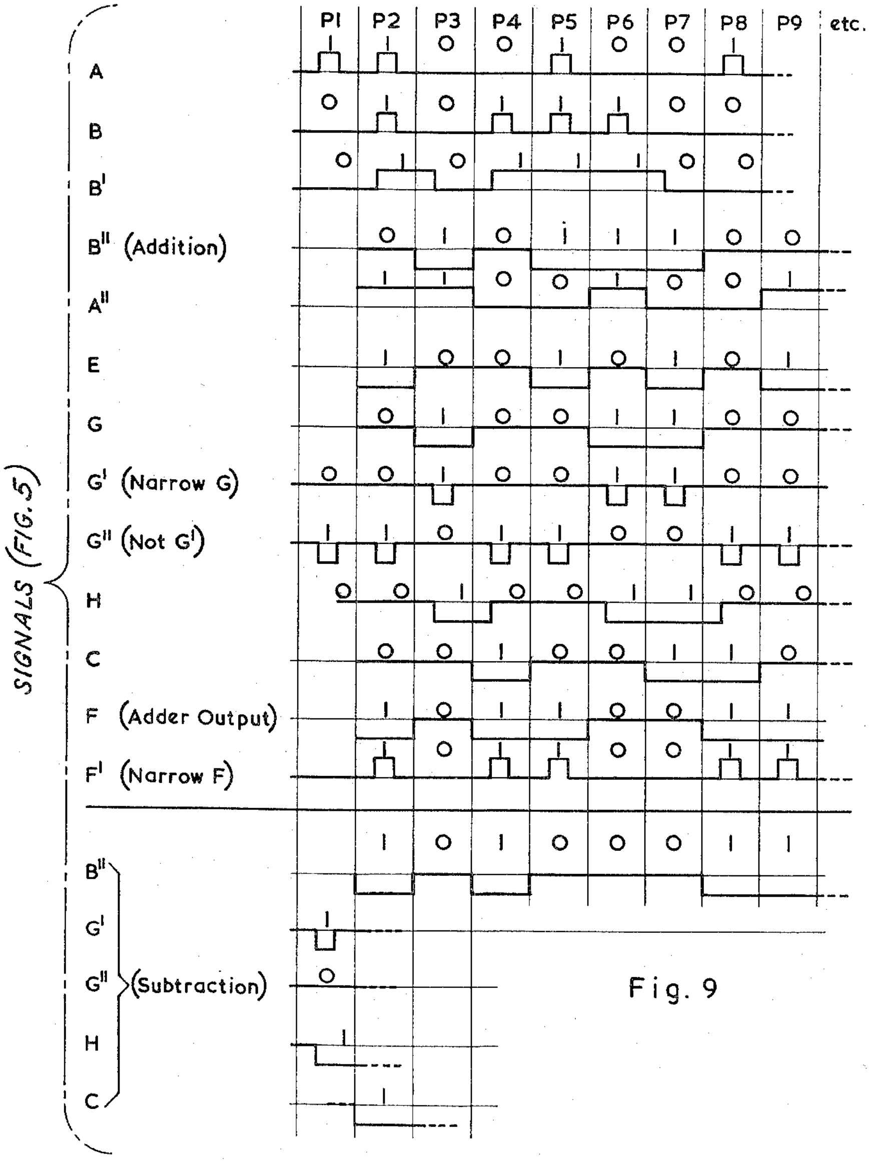

The digit values of the pulses occurring at various parts of the adder and the actual pulse waveforms are indicated in Figs. 8 and 9 respectively. In these figures the symbols P1, P2 etc. represent the digit pulse periods in engine time.

In Fig. 8, A and B show the first eight digits of the numbers to be added. $A^{11}$ and $B^{11}$ show the corresponding digits delayed one unit. These are the digits actually applied to the first half adder. E shows the not-equivalent output from the first half adder, i. e. $E=A^{11}\not\equiv B^{11}$. G shows the carry digits which come up on the common line joining the & outputs of the first and second half adders. C shows the G digits delayed one unit. The digits E and C are applied to the second half-adder. F shows the not-equivalent output from the second half-adder, i. e. $F=E\not\equiv C$. F represents the required sum $(A+B)$ but is, as explained above, one digit period behind engine time.

The corresponding pulses, and some others, are shown in Fig. 9. In this figure B shows the narrow pulse signal representing the number B in engine time, $B^1$ shows the same pulses widened by the widener 19 and $B^{11}$ shows the widened pulses delayed ⅔ microsecond so that each pulse just fills the digit pulse period next following the one in which it originally occurred. $A^{11}$ shows the widened and delayed pulses derived from the pulses A. Note that $B^{11}$ are negative-going pulses and $A^{11}$ are positive-going pulses.

The not-equivalent output pulses from the first half adder are shown at E and the carry pulses are shown at G. The narrow pulses derived from G are shown at $G^1$ and notice that $G^1$ at P1 time is zero whatever the value of G. The other narrow pulses derived from G are shown at $G^{11}$, notice also here that $G^{11}$, is one at P1 time whatever the value of G. Notice also that $G^{11}$=not-$G^1$, that is to say whenever $G^1$ is one $G^{11}$ is zero and vice versa.

The front edge of a $G^1$ pulse puts the trigger 15 on and so initiates a pulse shown at H and the front edge of the next occurring $G^{11}$ pulse puts the trigger 15 off and thus terminates the pulse. Notice that if the trigger is already on a $G^1$ pulse has no effect (as in period P7) and if the trigger is already off a $G^{11}$ has no effect (as in periods P1, P2, P5 and P9). It will be seen that H, the output from the carry trigger, corresponds to the carry pulses G delayed ⅓ microsecond. The one unit delayed carry pulses are shown at C; these correspond with the pulses H delayed ⅔ microsecond and hence occur one unit after G.

The output from the adder in wide pulses is shown at F. This output is converted into a narrow pulse output (shown at F1) by the action of the valves 10 and 11 shown in Fig. 5. The valve 10 normally conducts on its left-hand anode but is switched during the incidents of clock pulses applied to its right-hand grid so that the valve 11 can give an output depending on the value of the signal at F. Thus if F is a zero, 11 conducts (during clock pulse on) at its right-hand anode giving a low output potential and if F is a one, 11 conducts on its left-hand anode giving a higher output potential. Thus the narrow pulse output at $F^1$ is positive going. Fig. 9 also shows that this output is one unit behind engine time and needs retiming as explained above with reference to Fig. 4.

The adder has been described when operating to add. When it is required to subtract the valve 18 and not the valve 17 is energised to pass current and this switches the valve 3 to conduct on its right-hand anode; consequently the wide pulse signal at $B^{11}$ corresponds to not—B delayed one unit as shown at the lower part of Fig. 9 marked subtraction. This may easily be seen because the valve 2 is now effectively out of circuit and switching by a pulse (representing one) at $B^1$ on the valve 1 causes conduction on the right-hand anode of the valve 3 to cease and hence an increase in anode potential which corresponds to the resting level (zero) at $B^{11}$. Conversely a zero at $B^1$ leaves the valve 1 unswitched and the valve 3 continues to conduct on its right-hand anode which thus stays at a lower potential corresponding to a one at $B^{11}$. The output from the valve 18 also modifies the action of the round carry suppression part of the adder so that a carry pulse is injected at P1 time to become a one at the least significant digit time in the adder. This is done as follows. The valve 13 is switched to conduct on its right-hand anode by the signal on CA from the valve 18; consequently the wide P1 pulse on the valve 12 gates a clock pulse of current into the right-hand anode of the valve 13 and causes a narrow pulse at P1 time on the line $G^1$. This pulse (one) and the corresponding space (zero) on $G^{11}$ are shown respectively at $G^1$ and $G^{11}$ in the lower part of Fig. 9. The corresponding H and C pulses are also shown. The C pulse provides the one in the relation $$(A-B)=A+(\text{not } B)+1$$

explained above.

The delayed couplings such as 21 and 22 may be as shown in Figure 7. These are simply normal couplings with the load resistor replaced by a delayed network with the load matching it at the end. The component values shown produce about ⅓ micro-second delay. The low frequency component is not delayed but this is immaterial.

A suitable form of widener is shown in Figure 10. The pulses to be widened are applied through a condenser C1 to the control grid of the valve V1A which may be one half of a double triode. The grid of the valve V1A is connected through a resistance R1 to a point at −208 volts potential. The common cathode of the valves V1A and V1B is connected through a resistance R2 to a point of −300 volts potential. The anodes of the valves V1A and V1B are connected as shown and the pair of valves operate as a trigger having one state of stability to which it returns a predetermined operating time after it has been set. Such circuits are hereinafter called flip-flops. In the circuit shown the valve V1B conducts in the quiescent state. Part of the output from the anode of the valve V1A is applied through a condenser C3 to a second pair of valves V2A—V2B also connected to operate as a flip-flop. The anodes of the valves V1B and V2B are joined as shown to provide a common output terminal.

The operation of the circuit is as follows: In the quiescent state V1B is conducting and V1A is not conducting owing to the relative grid voltages. The condition of V2A and V2B is similar. The application of a positive going pulse to the grid of V1A results in the leading edge of the pulse causing V1A and V1B to be triggered into a condition in which V1A is conducting. The selection of the operating time of the flip-flop is such that V1A reverts to its quiescent state after half a micro-second.

The anode potential of V1A drops and the condenser C2 starts to charge until both V1A and V1B start to take current then the trigger reverts back to its initially quiescent condition. The diode D1 limits the grid of V1B to −200 volts and the charge in C2 returns to the quiescent value via the anode load of V1A and the diode D1. The value of the condenser C2 is chosen so that the trigger takes half a micro-second to revert to the state in which V1A is non-conducting, that is to say the operating time of the flip-flop is half a micro-second. The condenser reverts to its quiescent state in much less than a further half a micro-second so that the flip-flop V1A and V1B is ready to receive another pulse occurring one micro-second after the first.

When the V1A reverts to its non-conducting state a positive pulse is generated at the junction of L1 and R3 and this is passed, via the condenser C3, to the flip-flop V2A—V2B which goes through a cycle similar to that gone through by V1A—V1B so that the anode of V2A gives out a ½ micro-second pulse in alternative half cycles when the input at C1 is a pulse.

The circuit shown in Figure 10 has been described as operating with positive pulses applied and yielding positive pulses at the output. It can, however, easily be modified to work with negative pulses applied and to yield negative pulses at the input. The required modification consists in reversing the diodes D1, D2, reversing the bias conditions on the valves V1A, V1B and V2A, V2B, for example, by connecting the grid resistor of the valves V1A, V2A to −192 volts instead of −208 volts. The cathodes of the diodes D1 and D2 reversed should then be connected no to earth but to −300 volts through the resistances R5 and R6 which should be 100K ohms instead of 200K ohms.

The condensers C2 and C2′ are adjusted so that the operating times of each flip-flop is ½ micro-second and this is a convenient arrangement. The essential factor is, of course, that the sum of the operating times is one micro-second, i. e. the inter-digit time.

What I claim is:

1. In an electronic digital computer wherein operations are timed by periodic clock pulses each occupying, when on, less than a full pulse period, means for widening digit signal pulses, initially of the same width as the clock pulses, until each signal pulse occupies a period equal to a full pulse period, means for delaying the widened signal pulses until each signal pulse occupies the full pulse period occurring immediately after the pulse period in which the signal pulse originally occurred, and means for subjecting the widened and delayed signal pulses to gating operations.

2. A binary digital computer in which operations are timed by clock pulses each occupying less than a full pulse period, comprising means for applying signal pulses initially of the same width as the clock pulses and beginning contemporaneously with respective clock pulses, means for widening the signal pulses to the full width of the clock pulse period thereby inherently delaying the centers of the signal pulses with respect to centers of the respectively concomitant clock pulses and means for further delaying the widened pulses to bring the centers thereof into time coincidence with the centers of the respective next succeeding clock pulses.

3. A binary digital computor as set forth in claim 2, wherein the pulse period is one micro-second, the clock pulse width is ⅓ micro-second, the said inherent delay is ⅓ micro-second and the said further delay is ⅔ micro-second.

4. In an electronic digital computer that operates on cycles of uniformly periodic pulses wherein each pulse has a width equal to a predetermined fraction of the pulse period, a half adder having a first and a second input, and feeding into each input a widener component circuit acting upon each input pulse to widen it to the full pulse period and which inherently delays the center of said widened pulse by the said fraction of a pulse period, and additional delay means connected between said widener and the input of said half adder to effect a total delay of the center of said widened pulse equal to one pulse period.

5. A computer as set forth in claim 4 wherein the center of the input pulse is first delayed a time equal to the pulse period less the said fraction, then widened and then applied to the input of said half adder.

6. A computer as set forth in claim 4, wherein the said fraction is ⅓ of a pulse period and the said additional delay is ⅔ of a pulse period.

7. A computer as set forth in claim 4 wherein the pulse period is one micro-second.

8. A device as set forth in claim 4, having a first, a second and a third pair of conductive paths, each path of the first pair being effectively a part of the two paths of a respective other pair, the said widener being connected to control which path of the first pair shall conduct, respective means to control which path in each of said second and third pairs shall conduct, each of said respective means including a delay device of said fraction of a period, one of the said respective means operating to condition said half adder when addition is to be performed and the other to condition said half adder for subtraction, a common output connection to one path in each of said second and third pairs, and the said additional delay connected between said common output and said first input of said half adder.

9. A computer as set forth in claim 4, the said half adder having a not-equivalent output and an & output, in combination with a second half adder having a first input and a second input, the first input of said second half adder being connected to the not-equivalent output of said first half adder, means conditioned by pulses in the & output of said first half adder to feed into the second input of said second half adder, said last mentioned means including circuitry to delay said feeding in for one pulse period and means responsive to a predetermined pulse in a cycle to suppress said feeding in, and & ouput from said second half adder connected to the & output of said first half adder, and a sum output from said second half adder.

10. A computer as defined in claim 9, including means connected to the sum output of said second half adder and controlled by clock pulses to reshape and retime pulses from the said sum output.

11. An electronic digital computer that operates in cycles of uniformly periodic pulses that have a width ⅓ the width of the pulse period, comprising a first and a second half adder each having a first and a second input; a first pulse widener that inherently delays the center of the widened pulse ⅓ of the pulse period, an add gate and a subtract gate, respective means each including a ⅓ pulse period delay selectively to condition said gates for operation, means controlled by said widener to control operation of said gates, a common output including a ⅔ pulse period delay connecting said gates to the first output of said first half adder, a second pulse widener, a second ⅔ pulse period delay connecting the second widener to the second input of said first half adder, a not-equivalent output and an & output connected to said first half adder; means connecting the not-equivalent output of said first half adder to the first input of said second half adder, an & output from said second half adder connected to the & output of said first half adder, means responsive to pulses in said & outputs to apply carry pulses to the second input of said second half adder, the last-mentioned means including circuitry to delay for one pulse period the application of the carry pulse, means to suppress round carry, a sum output from said second half adder, and means connected to the said sum output to reshape and retime the sum output pulses.

References Cited in the file of this patent

UNITED STATES PATENTS

| | | |
|---|---|---|
| 2,554,112 | Libois | May 22, 1951 |
| 2,616,047 | Boothroyd | Oct. 28, 1952 |
| 2,648,836 | Newby et al. | Aug. 11, 1953 |
| 2,731,634 | Palmer | Jan. 17, 1956 |

OTHER REFERENCES

Progress Report No. 2 on the Edvac, Moore School of Engineering, University of Pennsylvania, declassified February 13, 1947, pages 1—1—3 to 1—1—4, Fig. 2–2 (PY—O—105), and Fig. 3–1 (PY—O—213) only.

A Functional Description of the Edvac, volumes 1 and 2, Moore School of Engineering, University of Pennsylvania, Nov. 1, 1949. Pages 4–10 to 4–12 and Fig. 104–3LC–3 only.